UNITED STATES PATENT OFFICE.

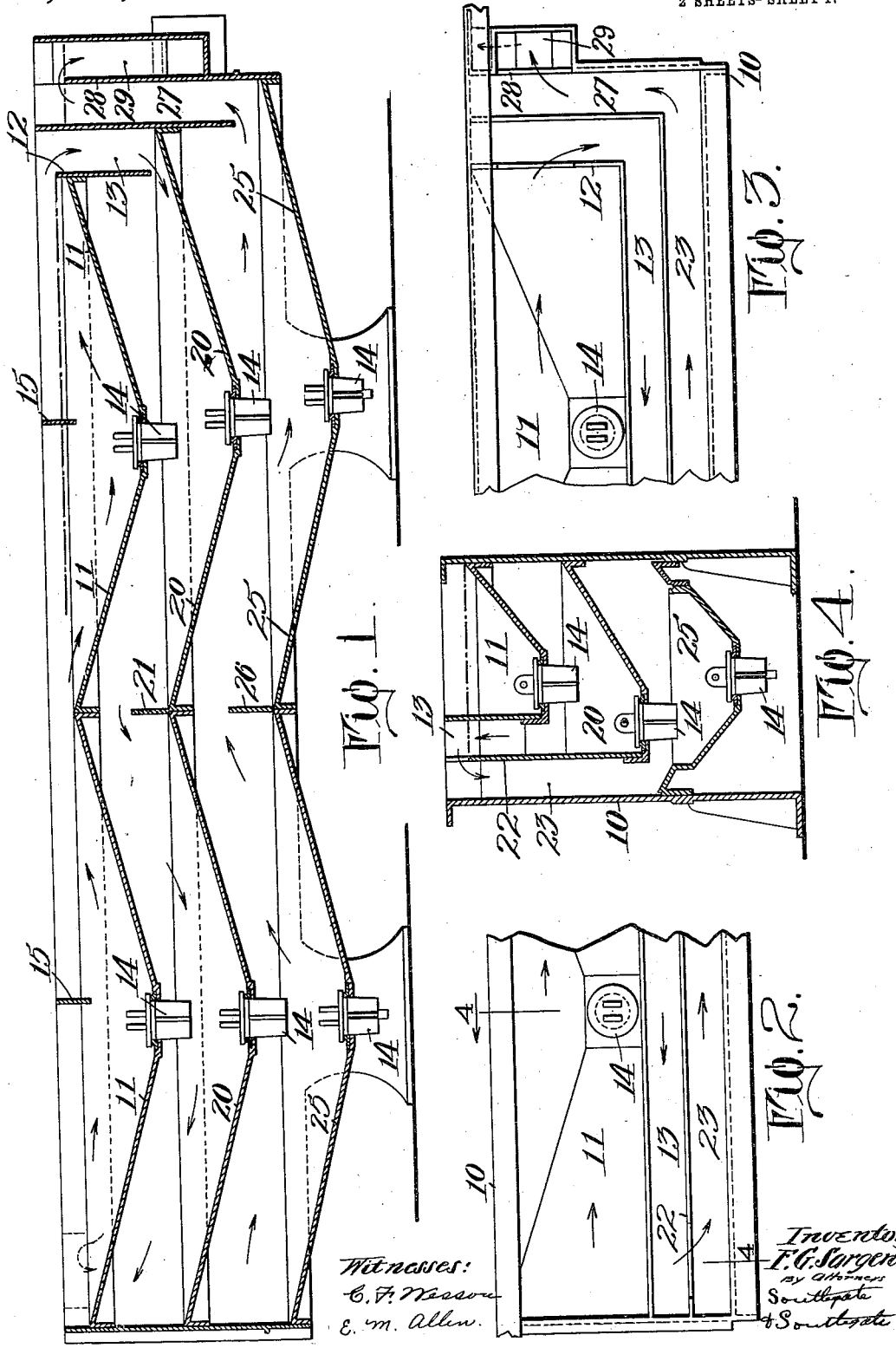

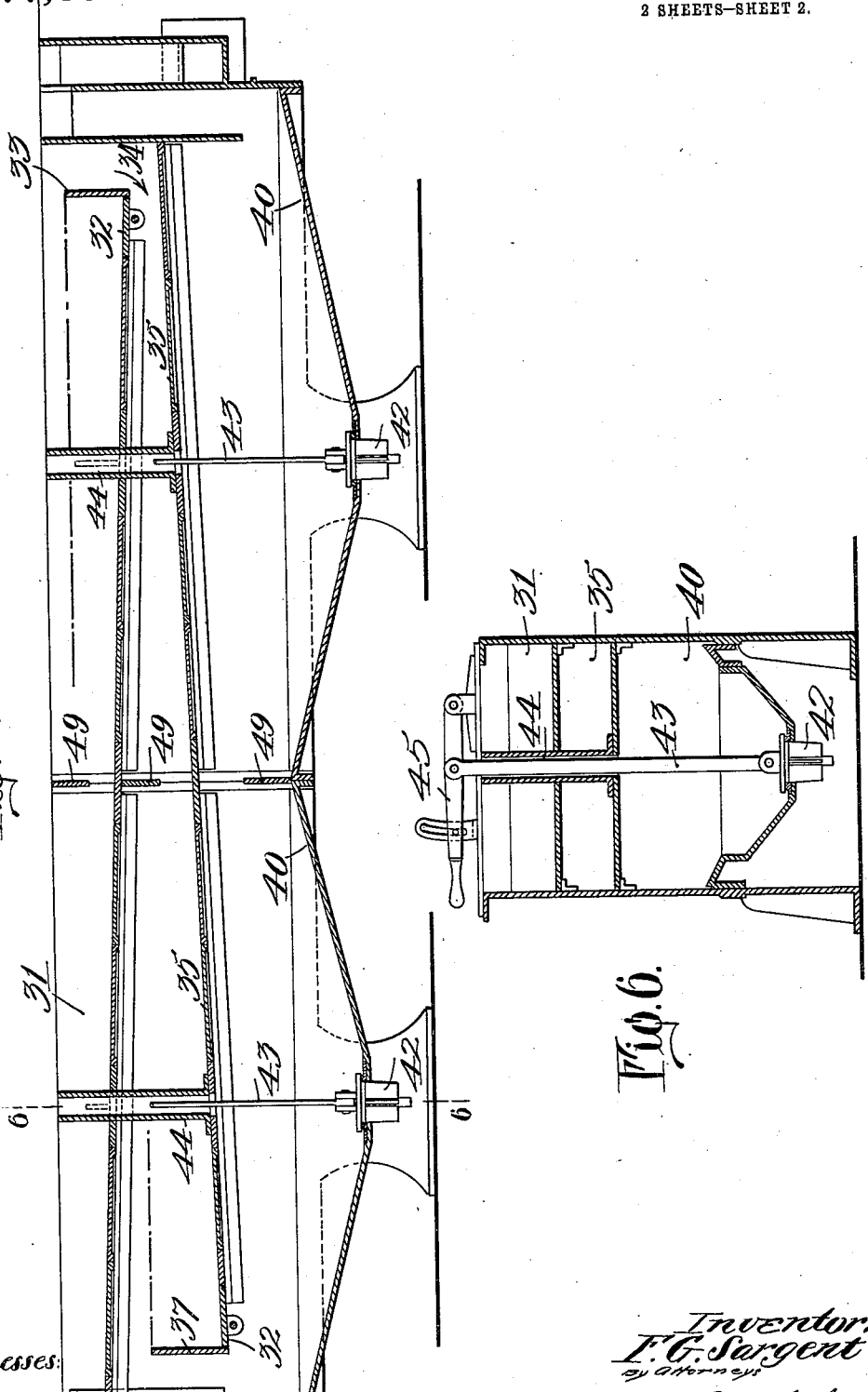

FREDERICK GRANDERSEN SARGENT, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

SETTLING-TANK.

1,077,308.  Specification of Letters Patent.  Patented Nov. 4, 1913.

Application filed July 24, 1912.  Serial No. 711,279.

*To all whom it may concern:*

Be it known that I, FREDERICK G. SARGENT, a citizen of the United States, residing at Westford, in the county of Middlesex and State of Massachusetts, have invented a new and useful Settling-Tank, of which the following is a specification.

This invention relates to a settling tank capable of general use, but especially adapted for connection with wool washing bowls.

The principal objects of the invention are to provide a settling tank which can be used for purifying the liquor that comes into the pan under the press rolls from a wool washing bowl and for delivering the same back into the bowl at the feed end; also to provide a settling tank capable of use for this purpose and for other uses which will give a maximum circulation of liquid for the space which it occupies and which shall be compact and easily drained and otherwise manipulated; also to provide a construction of this character in which the splashing that is incident to certain types of settling tanks will be avoided.

Further objects and advantages of the invention will appear hereinafter.

Reference is to be had to the accompanying drawings in which,

Figure 1 is a longitudinal sectional view of a settling tank constructed in accordance with this invention, Fig. 2 is a plan of one end thereof, Fig. 3 is a plan of the other end, Fig. 4 is a sectional view on the line 4—4 of Fig. 2, Fig. 5 is a view similar to Fig. 1 showing another way in which this invention can be carried out, and Fig. 6 is a sectional view of the same on the line 6—6 of Fig. 5.

The invention is shown in the first four figures in the form of a tank 10 having in the top thereof a first settling section 11. This section receives liquor at the left-hand end thereof in Fig. 1 and discharges it over a vertical wall 12 at the other end into a passage 13. The section 11 is shown as made up of two parts with converging bottoms having clean-out plugs 14 in said bottoms and provided with baffle plates 15 for the usual purpose. The liquor which flows over the wall 12 passes down under the bottom of the same into the second section 20. This section is made up to correspond in a general way with the section 11 having a partition 21 between the two parts thereof to assist in separating the heavy from the light portions of the material circulating in the tank. The liquor enters this in a direction opposite to that in which it circulated in the first section and at the discharge end passes over a partition 22 down through a passage 23 into the third section 25. This third section is made in a similar way to the others having a partition 26 at the center and at its discharge end it is provided with an upwardly extending passage 27 overflowing the outside wall 28 into an outlet 29 from which the skimmed liquor is adapted to be drawn off. The clean-out plugs 14 are shown in the two lower sections as well as the upper one.

The device can be used for receiving liquor at the intake end from the pan under the press rolls of a wool washing machine and for delivering it from the outlet 29 into the feed end of the washing bowl. For this purpose the tank in the first four figures can be mounted on the side of such a washing bowl but when used for other purposes, it can be made independent. It will be observed that with this construction the device is made extremely compact in comparison with the length of circulation secured, and as the level of the outlet is substantially the same as that of the liquor in the top section, all the sections are kept full and the liquor at the same level in all, and the circulation is quiescent, there being no chance for splashing or any action tending to roil the liquor. At the same time, the downwardly extending hopper-shaped bottoms of the upper sections act as skimming plates for the liquor in the sections below, and they coöperate in this way with the partitions 21 and 26 which extend upwardly from the bottoms. It is to be observed, also, that the passages 13 and 23 are located at the sides of the sections above.

In the form shown in the second sheet, substantially the same principles are present but the construction is somewhat different. In this case the upper section 31 is provided with a flat but slanting bottom having a clean-out 32 at the lower end thereof and a partition 33 behind it over which the overflow passes into a downwardly extending passage 34. Here it enters the second section 35 which likewise has a bottom slanting continuously down to the opposite end and this has another clean-out 32 and overflow over the end wall 37. The bottom section 40 is constructed substantially like the bottom section of Fig. 1 and its clean-out plugs 42 are operated from above by rods 43 extending up through passages 44. These rods are operated by levers 45 or in any other desired way. In this case, the bottoms of the several sections do not act as skimming devices and consequently the several sections are provided with skimming plates and partitions 49 for a well known purpose. The operation, however, is substantially the same as in the form shown in the other figures.

Although I have illustrated and described two forms in which the invention can be carried out, I am aware of the fact that it can be constructed in many other forms without departing from the scope of the invention as expressed in the claims. Therefore, I do not wish to be limited to all the details of construction herein shown and described, but What I do claim is:—

1. In a settling tank, the combination of a plurality of settling and skimming sections located one above another and all open to the atmosphere, and means for causing the partially clarified liquor from each section to overflow by gravity directly into the feed end of the one below and for maintaining the level of liquor in each section substantially as high as that in the section above, to keep the circulation quiescent.

2. In a settling tank, the combination of a plurality of sections arranged one above another, each section having a plurality of bottoms each pair of which converge downwardly at their meeting points, each section also being open to the atmosphere at the end and having an overflow at one end by means of which the liquor can pass by gravity to the section immediately below, the overflows of each two adjacent sections being located at opposite ends of the tank, an overflow extending upwardly from the bottom section to the level of the top section, the depressed portions of said bottoms extending down materially below the top of the liquor in the section below and located between the outlet and inlet thereof so as to constitute a skimming device therefor, and upwardly extending partitions from the highest point of each bottom between two adjacent depressed portions of the bottom above.

3. In a settling tank, the combination of a plurality of sections one above another, each section open to the atmosphere and having an overflow at one end by means of which the liquor passes by gravity to the section immediately below, the overflows of each two adjacent sections being located at opposite ends of the tank, and an overflow extending from the bottom section up to the level of the top section, the bottom of each section above the bottom one extending down materially below the top of the liquor in the section below transversely across the tank between the outlet and inlet thereof and constituting a skimming device therefor to prevent the liquor from flowing rapidly and cause it to deposit its heavier particles.

4. In a settling tank, the combination of a plurality of sections, one above another, the bottom of each section constituting the top of the section below, each section having an overflow at one end, an overflow extending up from the bottom section to the level of the liquor in the top section, the overflow from each section below the top one being located alongside one of the side walls of the top section and being at substantially the level of the top of the top section so that all the receptacles can be kept filled with liquor and splashing prevented.

5. As an article of manufacture, a settling tank comprising a plurality of sections one above another and all opening to the atmosphere at the top, each section having an overflow at one end, and located along the side wall, the overflows of each two adjacent sections being located at opposite ends, and each overflow extending up substantially to the level of the liquor in the top section, whereby all of said sections can be kept full of liquor.

In testimony whereof I have hereunto set my hand, in the presence of two subscribing witnesses.

FREDERICK GRANDERSEN SARGENT.

Witnesses:
 FRED W. SWAIN,
 OSBORN H. CILLEY.

Affidavit having been filed showing that the name of the patentee in Letters Patent No. 1,077,308, granted November 4, 1913, for an improvement in "Settling-Tanks," should have been written and printed *Frederick Grandison Sargent* instead of " Frederick Grandersen Sargent," it is hereby certified that the proper corrections have been made in the files and records pertaining to the case in the Patent Office and should be read in the said Letters Patent that the same may conform thereto.

Signed and sealed this 25th day of November, A. D., 1913.

[SEAL.]

J. T. NEWTON,

*Acting Commissioner of Patents.*